RATIO COMPUTER HAVING AN UNBALANCING CIRCUIT IN THE FEEDBACK LOOP

Filed Aug. 9, 1954

INVENTOR.
GEORGE L. LARSE
BY George C. Sullivan
Agent

United States Patent Office 2,905,385

Patented Sept. 22, 1959

2,905,385

RATIO COMPUTER HAVING AN UNBALANCING CIRCUIT IN THE FEEDBACK LOOP

George L. Larse, Van Nuys, Calif., assignor to Lockheed Aircraft Corporation, Burbank, Calif.

Application August 9, 1954, Serial No. 448,710

6 Claims. (Cl. 235—196)

Figures 1, 2:
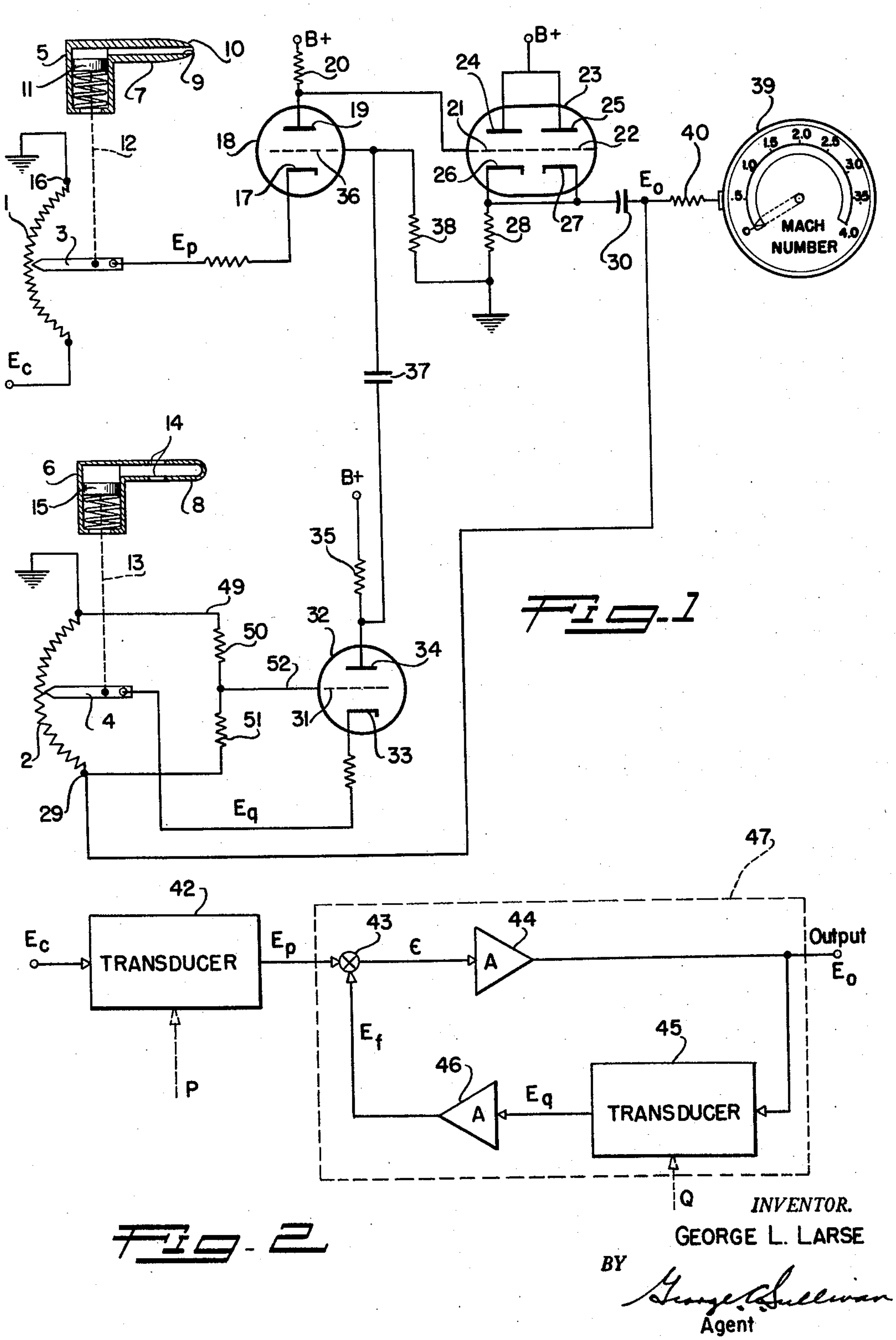

This invention relates to an electronic ratio computer which provides an output voltage representing the ratio between two independently varying physical quantities such as pressure, strain, temperature, displacement, etc. A specific application of the ratio computer is its use as a machmeter for determining the speed of an aircraft relative to the speed of sound.

Mechanical and electro-mechanical ratio computers, in general, are known to be old in the art, however, an electronic ratio computer capable of accurate operation even for very low ratio denominator values, as shown and described herein, is, so far as is known, new and it represents a substantial advance over related prior art devices.

Ratio measurement or arithmetic division is generally accomplished by means of a self-balancing servo device which has only limited response. Such a device normally requires direct voltage inputs that are proportional to the physical quantities being operated on. This necessitates the use of transducers which are separate from the ratio computer circuit and are used merely to provide voltage inputs to self-balancing servo-motors. Furthermore, conventional ratio computers are more complex, heavier and less accurate than the computer of this invention.

In the computer of this invention the physical quantities to be operated on are applied directly to transducers forming a part of the computer circuit. The transducer output voltages are applied to an electrical differential and suitably amplified to provide a computer output voltage which is proportional to the ratio between the input quantities.

An object of this invention is to provide an electronic ratio computer having a high response rate for automatically computing the ratio of physical quantities for a variety of indicating, recording and control applications.

Another object of this invention is to provide an electronic computer which will compute the reciprocal of an input variable.

Another object of this invention is to provide a machmeter for indicating the speed of an object relative to the speed of sound.

Another object of this invention is to provide an electronic ratio computer having one of its input transducers serving as an integral part of the computer feedback circuit.

Another object of this invention is to provide an electronic ratio computer having a voltage output which is a linear function of the input ratio over a wide dynamic range.

Still another object of this invention is to provide an electronic ratio computer which is relatively simple in design and accurate in operation, and which may be packaged as a small, light-weight unit particularly adaptable to aircraft electronic applications.

Further and other objects will become apparent from a reading of the following description, especially when considered together with the accompanying drawing wherein like numbers refer to like parts.

In the drawing:

Figure 1 is a schematic circuit of the ratio computer as used for a machmeter; and Figure 2 is a functional block diagram of the ratio computer.

The ratio computer as shown in Figure 1 is a machmeter device for measuring the speed of an object relative to the speed of sound at any altitude. A pair of suitable transducers 1 and 2, such as those of the potentiometer type having movable pickup arms 3 and 4 respectively, are employed in the circuit to provide voltages which are proportional to independently varying physical pressure quantities.

Suitable pressure operated actuators 5 and 6 are employed in conjunction with Pitot tubes 7 and 8 for positioning transducer pickup arms 3 and 4. Pitot tube 7 is provided with an opening 9 in its nose 10 for receiving ram air. The ram air pressure is applied to a movable piston 11 in the actuator 5. A mechanical link 12 connects piston 11 with pickup arm 3 and drives the latter in accordance with the magnitude of the ram air pressure applied to the actuator.

Actuator 6 is connected to pickup arm 4 through a mechanical link 13 in a manner similar to that described above. The primary difference between the two pressure sensitive actuators is in the construction of the Pitot tubes. Pitot tube 8, rather than having an opening in the nose-like tube 7, is provided with a plurality of radial openings 14 in the wall of the tube which will measure the static air pressure and apply the same to piston 15 in the associated actuator 6. Thus pickup 4 is positioned in accordance with the magnitude of the static air pressure.

The low pressure end 16 of transducer 1 is grounded and the high pressure end is connected to an alternating carrier voltage source identified as $E_c$ such that the voltage $E_p$ appearing at pickup 3 is always proportional to the ram or dynamic air pressure measured with Pitot tube 7. The dynamic pressure voltage $E_p$ from transducer 1 is applied to the cathode 17 of an amplifier tube 18 operating as a differential amplifier.

Anode 19 of tube 18 connects with a suitable source of electrical potential identified as B+ through a plate load resistor 20. The voltage at anode 19 is applied to the grids 21 and 22 of a twin tube cathode follower 23. Anodes 24 and 25 of the cathode follower connect with B+ while cathodes 26 and 27 have a common ground through a load resistor 28. The voltage $E_o$ at cathodes 26 and 27 is applied to the high pressure end 29 of transducer 2 through a coupling condenser 30.

Transducer 2 is bridge connected to a pair of resistors 50 and 51 for balancing the transducer output obtained through pickup arm 4. The transducer output, $E_q$, which is directly proportional to the static air pressure measured with Pitot tube 8 is applied to cathode 33 of a second electronic amplifier 32. Grid 31 of amplifier 32 connects with transducer 2 through lead 52 at a point between the two bridge balancing resistors 50 and 51. Anode 34 of amplifier 32 connects with B+ through a plate load resistor 35.

The anode voltage, $E_f$, which is $E_q$ times the gain of amplifier 32, is applied to grid 36 of amplifier tube 18 through coupling condenser 37 to complete a negative feedback loop controlling the operation of tube 18 and causing it to serve as a differential amplifier wherein the anode voltage represents the amplified difference between voltages $E_p$ and $E_f$. Resistor 38 provides a D.C. grid return for tube 18.

The $E_o$ voltage applied to transducer 2 from the output of cathode follower 23 is also applied to an indicating device 39 through resistor 40. Indicating device 39 is calibrated to read Mach number directly. This may be readily accomplished since the ratio between the dynamic and static air pressure values is a function of speed relative to the speed of sound.

A theoretically exact measurement of the ratio between dynamic and static pressures is obtained with the computer by offsetting the balance of transducer 2 to provide a small amount of regenerative feedback as verified by the analysis hereinafter set forth. The required amount of regenerative feedback may be produced by selecting the proper values for resistors 50 and 51. Thus a predetermined grid to cathode voltage is applied to amplifier 32 even when the static pressure is reduced to zero. While this would cause the feedback circuit to oscillate if the static pressure should reach zero, as a practical matter this condition never exists. Therefore, the circuit will effectively function as a ratio computer.

An understanding of the operation of the ratio computer can best be obtained by referring to the functional block diagram shown in Figure 2 wherein a carrier voltage $E_c$ of constant amplitude, is applied to a numerator transducer 42 of either the potentiometer or variable reluctance type which will modify the $E_c$ voltage in accordance with the magnitude of the physical quantity P applied thereto and provide an output voltage $E_p$ proportional to the input quantity P. The $E_p$ voltage is applied to a differential 43, the output of which is amplified by amplifier 44. As shown in Figure 2, the output of amplifier 44 supplies the carrier voltage applied to a denominator transducer 45 which has an output voltage $E_q$ proportional to the magnitude of a second physical quantity, Q. $E_q$ is amplified in a second amplifier 46 and applied to differential 43 as the feedback voltage $E_f$. It is the difference, $\epsilon$, between the output voltage of numerator transducer 42 and the feedback voltage $E_f$ that is amplified by amplifier 44 to produce the output voltage $E_o$ which is proportional to the ratio between the two physical input quantities.

If $K_1$ is designated the gain of amplifier 44 and $K_2$ is designated the gain of amplifier 46, it is shown by the following analysis that the gain of the feedback circuit 47 is very nearly inversely proportional to the input quantity Q, provided that the loop gain ($K_1K_2Q$) is much greater than unity for all values of Q and that it is theoretically exactly inversely proportional to Q if the balance of denominator transducer 45 is offset to provide a slight amount of regenerative feedback.

Specifically referring to Figure 2, the operation of the transducers is characterized by the following relationships:

$$E_p=E_cP \text{ and } E_q=E_oQ$$

where P and Q are the input quantities.

The relationship between the output voltage $E_o$ and P and Q is derived as follows:

by definition $$\epsilon=-E_o/K_1=E_p-E_f \tag{1}$$

and $$E_f=-K_2E_q=-K_2E_oQ \tag{2}$$

or $$-\frac{E_o}{K_1}=E_p+K_2E_oQ \tag{3}$$

Equation 3 reduces to:

$$E_o(-1/K_1-K_2Q)=E_p \tag{4}$$

or $$E_o/E_p=\frac{1}{-\frac{1}{K_1}-K_2Q}=-\frac{K_1}{1+K_1K_2Q} \tag{5}$$

Thus, if $K_1K_2Q$ is much greater than unity $$(K_1K_2Q>>/)$$

all values of Q, then $E_o/E_P$ is nearly equal to $$-\frac{1}{K_2Q}$$

Hence $$E_o\cong-\frac{E_p}{K_2Q}\cong-\frac{E_cP}{K_2Q}$$

or $$E_o\cong\alpha\frac{P}{Q}$$

where $\alpha$ is a proportionality constant equal to $$-\frac{E_c}{K_2}$$

However, by offsetting the balance of transducer 45 to provide regenerative feedback so that the transducer transfer characteristic becomes $E_q=E_o(Q-\beta)$, where $\beta$ is a constant representing the amount of the offset, Equation 5 reduces as follows:

$$E_o/E_p=-\frac{K_1}{1+K_1K_2Q-K_1K_2\beta} \tag{6}$$

By adjusting $\beta$ (the amount of the offset) so that $1-K_1K_2=0$, or $$\beta=\frac{1}{K_1K_2}$$

the relationship becomes:

$$E_o/E_p=-\frac{K_1}{K_1K_2Q}=-\frac{1}{K_2Q} \tag{7}$$

Therefore $$E_o=-\frac{E_p}{K_2Q}=-\frac{E_cP}{K_2Q}=\alpha P/Q \tag{8}$$

where $\alpha$ is the proportionality constant equal to $-E_c/K_2$.

It is clear from the above analysis that the ratio computer is theoretically capable of providing a voltage output which is exactly proportional to the ratio between the input quantities P and Q, when the second transducer is offset to provide an amount of regenerative feedback equal to one over the total gain of amplifiers 44 and 45. This provides a very simple and straight forward method of computing ratios of any physical quantities such as pressures for either indicating, recording or control purposes.

In view of the fact that the computer may be packaged as a small, light-weight unit, it is especially adaptable to aircraft uses, though obviously it is equally as useful in other fields.

By simply eliminating transducer 42 in Figure 2, and feeding the voltage $E_c$ directly into differential 43, the circuit will compute the reciprocal of the input quantity Q.

The second amplifier identified as amplifier 32 in Figure 1 and as amplifier 46 in Figure 2 may be eliminated in many cases when using high level transducers such as the potentiometer type without materially affecting the accuracy of the computer nor its mode of operation.

While the ratio computer is described in connection with a machmeter device it is merely for purposes of illustration. There are many other applications for the ratio computer circuit and it is to be understood that certain alterations, modifications and substitutions, such as those mentioned above, may be made to the instant disclosure without departing from the spirit and scope of this invention as defined by the appended claims.

I claim:

1. A ratio computer for automatically computing the ratio between two independently varying pressures comprising; a source of electrical potential, a transducer electrically connecting with said source of electrical potential and being responsive to one of the two independently varying pressures to produce an output voltage proportional thereto, a second transducer responsive to the other of said two independently varying pressures and having a voltage output varying therewith, differential means responsive to the voltage outputs from said transducers and having an output voltage representing the difference therebetween, the output from said differential means being applied to said second transducer as its input voltage source whereby the output voltage level of said transducer is controlled by the output voltage from said differential means, amplifier means interposed in the negative feedback loop defined by the differential means and said second transducer for maintaining a loop gain greater than unity for all pressures applied to said second transducer, and unbalancing means connecting with said second transducer and providing a regenerative feedback voltage in said feedback loop which is substantially equal to the reciprocal of the gain of said amplifier means whereby the voltage appearing as the input to said second transducer represents the ratio between the two independently varying pressures.

2. An electronic ratio computer for automatically computing the ratio between two independently varying physical quantities comprising, a source of electrical potential, a numerator transducer connecting with said source of electrical potential and being responsive to one of said physical quantities to provide an output voltage proportional to the magnitude of such quantity, differential amplifier means responsive to the numerator transducer and having a denominator transducer carrier voltage output, a denominator transducer connecting with the output of the differential amplifier means and being responsive to the other of said two physical quantities and having a voltage output varying with the magnitude thereof, the denominator transducer output connecting with said differential amplifier means forming a feedback circuit, and denominator transducer unbalancing means providing a regenerative feedback voltage in said feedback circuit which is substantially equal to the reciprocal of the gain in said amplifier means whereby the denominator transducer carrier voltage appearing as the output from said amplifier means represents the ratio between the two independently varying physical quantities.

3. An electronic computer for automatically computing the reciprocal of an input variable comprising, a source of electrical potential, a high gain differential amplifier having an anode, a cathode and a control electrode, said cathode connecting with said source of electrical potential, denominator transducer means connecting with said anode and with said control electrode forming a negative feedback circuit with said differential amplifier, said denominator transducer means being responsive to the input variable for modifying current flow therethrough in accordance with changes in magnitude of said input variable, and transducer unbalancing means providing a regenerative feedback voltage in said feedback circuit which is substantially equal to the reciprocal of the gain of said amplifier whereby the voltage at the anode of said differential amplifier represents the reciprocal of said input variable.

4. An electronic computer for automatically computing ratios comprising, high gain differential amplifier means having an anode, a cathode and a control electrode, numerator transducer means connecting with said cathode and applying a voltage thereto, the magnitude of which represents the ratio numerator, denominator transducer means having a carrier voltage input connecting with said anode and an output voltage representing the ratio denominator connecting with said control electrode and forming a negative feedback loop with said differential amplifier means, and unbalancing means connecting with said denominator transducer means and providing a regenerative feedback voltage in said feedback loop which is substantially equal to the reciprocal of the gain of said amplifier means whereby the voltage appearing as the input to said denominator transducer represents the computer output ratio.

5. A ratio computer for automatically computing the ratio between two independently varying physical quantities comprising; a source of electrical potential, a numerator transducer connecting with said source of electrical potential and being responsive to one of said physical quantities to provide an output voltage proportional to the magnitude of such quantity, a differential amplifier having an anode, a cathode and a control electrode, said cathode connecting with the output from said numerator transducer, a denominator transducer connecting with the anode of said differential amplifier and being responsive to the other of said two physical quantities and having an output proportional to the magnitude thereof, a second amplifier connecting with the output from said denominator transducer and having a feedback output connecting with the control electrode of said differential amplifier to form a high gain feedback loop, and denominator transducer unbalancing means providing a regenerative feedback voltage in said feedback loop which is substantially equal to the reciprocal of the gain of said differential and second amplifiers whereby the voltage at the anode of said differential amplifier accurately represents the ratio between the two independently varying physical quantities.

6. A ratio computer for automatically computing the ratio between two independently varying physical quantities comprising; a source of electrical potential, a numerator transducer connecting with said source of electrical potential and being responsive to one of said physical quantities to provide an output voltage proportional to the magnitude of such quantity, a differential amplifier having an anode, a cathode and a control electrode, said cathode connecting with the output from said numerator transducer, a denominator transducer connecting with the anode of said differential amplifier and being responsive to the other of said two physical quantities and having an output proportional to the magnitude thereof, a second amplifier having an anode, a cathode and a control electrode, the cathode of said second amplifier connecting with the output from said denominator transducer, the anode of said second amplifier connecting with the control electrode of said differential amplifier, completing a negative feedback loop including said denominator transducer, and unbalancing means connecting with said denominator transducer and having an output applied to the control electrode of said second amplifier which represents the reciprocal of the gain of said differential and second amplifiers and provides a cathode to control electrode regenerative feedback voltage whereby the anode voltage applied to said denominator transducer accurately represents the ratio between the two independently varying physical quantities.

References Cited in the file of this patent

UNITED STATES PATENTS

| | | |
|---|---|---|
| 2,402,210 | Ryder et al. | June 18, 1946 |
| 2,581,456 | Swift | Jan. 8, 1952 |
| 2,607,844 | Turner | Aug. 19, 1952 |
| 2,665,066 | Hornfeck | Jan. 5, 1954 |
| 2,698,134 | Agins | Dec. 28, 1954 |

OTHER REFERENCES

Electronic Instruments (Greenwood et al.), 1948, p. 17.